US009932502B2

(12) United States Patent
Janke et al.

(10) Patent No.: US 9,932,502 B2
(45) Date of Patent: Apr. 3, 2018

(54) REACTIVE POLYOLEFIN HOT MELT ADHESIVE WITH LOW ADHESION TO UNCOATED ALUMINUM TOOLS AND USE THEREOF AS A LAMINATING HOT MELT

(71) Applicant: Sika Technology AG, Baar (CH)

(72) Inventors: Doreen Janke, Alveslohe (DE); Kai Paschkowski, Jork (DE)

(73) Assignee: SIKA TECHNOLOGY AG, Baar (CH)

( * ) Notice: Subject to any disclaimer, the term of this patent is extended or adjusted under 35 U.S.C. 154(b) by 30 days.

(21) Appl. No.: 14/709,977

(22) Filed: May 12, 2015

(65) Prior Publication Data
US 2015/0240135 A1 Aug. 27, 2015

Related U.S. Application Data

(63) Continuation of application No. PCT/EP2013/073257, filed on Nov. 7, 2013.

(30) Foreign Application Priority Data

Nov. 12, 2012 (EP) .................... 12192207

(51) Int. Cl.
| | | |
|---|---|---|
| *C09J 151/06* | (2006.01) | |
| *C09J 5/06* | (2006.01) | |
| *B32B 37/12* | (2006.01) | |
| *B32B 5/02* | (2006.01) | |
| *B32B 7/12* | (2006.01) | |
| *B32B 27/08* | (2006.01) | |
| *B32B 27/12* | (2006.01) | |
| *B32B 27/18* | (2006.01) | |
| *B32B 27/28* | (2006.01) | |
| *B32B 27/32* | (2006.01) | |
| *C08L 23/02* | (2006.01) | |
| *C08L 91/06* | (2006.01) | |

(52) U.S. Cl.
CPC .............. *C09J 151/06* (2013.01); *B32B 5/022* (2013.01); *B32B 7/12* (2013.01); *B32B 27/08* (2013.01); *B32B 27/12* (2013.01); *B32B 27/18* (2013.01); *B32B 27/283* (2013.01); *B32B 27/32* (2013.01); *B32B 37/1207* (2013.01); *C09J 5/06* (2013.01); *B32B 2037/1215* (2013.01); *B32B 2307/702* (2013.01); *B32B 2383/00* (2013.01); *C08L 23/02* (2013.01); *C08L 91/06* (2013.01); *C09J 2400/226* (2013.01); *C09J 2400/263* (2013.01); *C09J 2451/00* (2013.01); *C09J 2451/003* (2013.01)

(58) Field of Classification Search
CPC ...... C08L 91/06; C08L 91/08; C08L 2266/02; C08L 2266/30
See application file for complete search history.

(56) References Cited

U.S. PATENT DOCUMENTS

| | | | |
|---|---|---|---|
| 5,241,014 A | 8/1993 | Kehr et al. | |
| 5,461,110 A * | 10/1995 | Arthurs | C09J 151/06 427/207.1 |
| 5,731,384 A | 3/1998 | Chenard | |
| 5,994,474 A | 11/1999 | Wey et al. | |
| 6,894,115 B2 * | 5/2005 | Botros | C09J 123/06 525/100 |
| 7,005,476 B1 * | 2/2006 | Terfloth | C09J 201/10 524/578 |
| 9,012,563 B2 | 4/2015 | Yalvac et al. | |
| 2004/0127614 A1 | 7/2004 | Jiang et al. | |
| 2005/0160940 A1 | 7/2005 | Hippold et al. | |
| 2008/0167421 A1 | 10/2008 | Yalvac et al. | |
| 2008/0312401 A1 * | 12/2008 | Sato | C08F 283/12 528/31 |
| 2012/0136082 A1 * | 5/2012 | Daiss | C08F 30/08 521/143 |
| 2012/0171466 A1 | 5/2012 | Urbach et al. | |
| 2014/0329074 A1 | 6/2014 | Janke et al. | |
| 2015/0045509 A1 * | 2/2015 | Tomatsu | C09J 151/06 525/95 |

FOREIGN PATENT DOCUMENTS

| | | |
|---|---|---|
| CN | 101248099 A | 8/2008 |
| CN | 102482544 A | 5/2012 |
| CN | 103958632 A | 7/2014 |
| DE | 40 00 695 A1 | 7/1991 |

(Continued)

OTHER PUBLICATIONS

Using Waxes in Hot Melt Adhesives authored by Andy Extance and published on the SpecialChem website in Dec. 2009.*

(Continued)

*Primary Examiner* — Marc S Zimmer
(74) *Attorney, Agent, or Firm* — Buchanan Ingersoll & Rooney PC

(57) ABSTRACT

A hot melt adhesive composition is provided which contains at least one silane group-containing thermoplastic poly-α-olefin which is solid at 25° C. and at least one paraffin wax. The hot melt adhesive composition has only low adhesion to uncoated aluminum tool surfaces, wherein at the same time they have high final strengths and thermal stabilities comparable to conventional adhesives, as well as good resistance to environmental influences. The hot melt adhesive is suitable as a laminating adhesive for laminating films made of thermoplastic olefins, which have sufficient stability for subsequent deep-draw lamination.

25 Claims, No Drawings

(56) References Cited

FOREIGN PATENT DOCUMENTS

| GB | 2 197 326 A | | 5/1988 |
|---|---|---|---|
| JP | 55-040721 | * | 3/1980 |
| JP | 55-40721 A | | 3/1980 |
| RU | 2054023 C1 | | 2/1996 |
| WO | WO 00/47687 A1 | | 8/2000 |
| WO | WO 03/070851 A1 | | 8/2003 |
| WO | 2009/133093 A1 | | 11/2009 |
| WO | WO 2013/162063 | * | 10/2013 |

OTHER PUBLICATIONS

Office Action (Notification of the First Office Action) dated Jun. 30, 2016, by the State Intellectual Property Office of the People's Republic of China in corresponding Chinese Patent Application No. 201380057498.9, and an English Translation of the Office Action (21 pages).
Notification of Transmittal of Translation of the International Preliminary Report on Patentability and the Written Opinion of the International Searching Authority (Forms PCT/IB/338, PCT/IB/373, PCT/ISA/237) dated May 21, 2015, by the International Bureau of WIPO in corresponding International Application No. PCT/EP2013/073257. (7 pages).
Office Action (Communication) dated Jan. 16, 2017, by the European Patent Office in corresponding European Patent Application No. 13788751.9. (4 pages).
International Search Report (PCT/ISA/210) dated Dec. 12, 2013, by the European Patent Office as the International Searching Authority for International Application No. PCT/EP2013/073257.
Written Opinion (PCT/ISA/237) dated Dec. 12, 2013, by the European Patent Office as the International Searching Authority for International Application No. PCT/EP2013/073257, and English translation thereof.
Search Report dated Feb. 21, 2013, by the European Patent Office for Application No. 12192207.4.
Office Action (Notification of the Second Office Action) dated Apr. 12, 2017, by the Chinese Patent Office in corresponding Chinese Patent Application No. 201380057498.9, and an English Translation of the Office Action. (16 pages).
Office Action dated Aug. 1, 2017, by the European Patent Office in corresponding European Patent Application No. 13788751.9, and an English Translation of the Office Action. (6 pages).
Office Action dated Oct. 19, 2017, by the Russian Patent Office in corresponding Russian Patent Application No. 2015114682/05(022959) (11 pages including partial English translation).

* cited by examiner

REACTIVE POLYOLEFIN HOT MELT ADHESIVE WITH LOW ADHESION TO UNCOATED ALUMINUM TOOLS AND USE THEREOF AS A LAMINATING HOT MELT

RELATED APPLICATIONS

This application claims priority as a continuation application under 35 U.S.C. § 120 to PCT/EP2013/073257, which was filed as an International application on Nov. 7, 2013 designating the U.S., and which claims priority to European Application No. 12192207.4 filed in Europe on Nov. 12, 2012. The entire contents of these applications are hereby incorporated by reference in their entireties.

BACKGROUND INFORMATION

Reactive polyolefin compositions that can be used as hot melt adhesives (also referred to as hotmelts) have been known for a long time. They usually include silane-grafted polyolefin prepolymers obtained by mixing with other polymers with resins. Such adhesives develop a high initial strength immediately after their application due to cooling, and they achieve their final properties, for example, heat resistance and resistance to environmental influences, due to the gradually occurring "curing," i.e., the chemical reaction of the silane groups with atmospheric moisture.

For film laminating, for example, for vacuum deep-draw processes in car manufacturing, polyurethane (PUR) adhesives in various forms are predominantly used. PUR adhesives are used predominantly in dispersed or dissolved form. In these adhesive systems, due to the high molecular weight of the polyurethane, it is necessary to work using the contact process, i.e., the adhesives are applied to the substrate portion together with the carrier fluid in order to be able to develop good adhesion to the substrate portion. For this purpose, the film to be laminated is treated beforehand with a primer. During the lamination process itself, the film is subsequently heated and pressed by means of a vacuum onto a substrate portion. In this process, the adhesive located on the substrate joins with the primer of the film.

However, the disadvantage when using dissolved or dispersed adhesives is the necessity of having to apply the adhesive to the substrate portion. As a rule, the substrate portions are three-dimensionally molded. Therefore, it is necessary to spray the adhesive onto the molded substrate, which is relatively complicated in practice. In addition, the "overspray" arising can be critical, that is to say the fact that a portion of the respective adhesive compositions cannot be applied to the substrate portion.

To overcome this disadvantage, there has been an increase most recently in attempts to use polyurethane adhesives in the form of reactive hot melt adhesives for the film laminating process. When the latter are used, it is not necessary to spray the three-dimensionally molded substrate portion. Instead, it is sufficient to apply the adhesive to the film. This is considerably simpler, since the film is two dimensional. The adhesive can be applied easily by different processes as a film onto the film, and "overspray" can be avoided.

Reactive polyurethane hot melt adhesive compositions that are suitable for corresponding uses have already been described. They usually include isocyanate-terminated polyurethane prepolymers obtained by reacting suitable polyols with an excess of diisocyanates. Such adhesives develop a high initial strength immediately after their application due to cooling, and they achieve their final properties, for example, heat resistance and resistance to environmental influences, due to the gradually occurring "curing," i.e., the chemical reaction of the isocyanate groups with atmospheric moisture. The reactive polyurethane adhesive has a distinctly lower molecular weight during processing than corresponding dissolved or dispersed polyurethane adhesives.

However, the polyurethane adhesives used today in laminating, regardless of whether they are applied dissolved, dispersed or as hot melt adhesive, have serious disadvantages in the case of use with olefinic substrates. Thus, as a rule, preliminary treatment of the corresponding substrates is necessary, since otherwise the polar polyurethane adhesive would not adhere to the nonpolar olefinic surface.

This disadvantage of highly different polar properties is considerably lower with adhesives based on amorphous poly-α-olefins in the case of use with olefinic substrates owing to the greater similarity of the properties of the adhesives to those of the films to be treated. In spite of this advantage, hardly any adhesive systems based on poly-α-olefins for laminating applications are encountered in practice. The reason for this is that olefinic adhesives marketed today are usually not suitable for vacuum deep-draw laminating or have other substantial disadvantages.

In addition to purely olefinic adhesives, ethylene/vinyl acetate copolymers modified with silane groups have also been described as adhesives. For example, GB 2197326 A discloses adhesive compositions made of silane-grafted ethylene/vinyl acetate copolymers with a vinyl acetate content in the range from 18 to 40% in combination with a catalyst and a plasticizer. It is exemplary for these adhesives to be characterized by a particularly advantageous resistance to organic solvents, a high adhesive strength, and a high resistance to creep failure of the adhesives. Some of the applications for such adhesives mentioned in GB 2197326 A are assembly, for example, in the furniture and car industry, packaging or labeling.

U.S. Pat. No. 5,731,384 also describes hot melt adhesives based on silane-modified ethylene-vinyl acetate which crosslink under the influence of moisture. It is exemplary for these adhesives to be characterized by good strength of adhesion to various substrates and advantageous adhesion properties at high temperatures, particularly on glass and aluminum.

Olefinic adhesives are available, for example, as dissolved systems; however, there is a demand for avoiding processing of solvent-containing adhesives. In addition, solvents that are suitable for dissolving nonpolar olefinic adhesives can be critical in terms of their use. Olefin-based hot melt adhesives, on the other hand, are commonly used, in particular in the car industry. Usually they are used as thermoplastic adhesives, but not for laminating three-dimensionally molded substrate portions. However, without chemical curing, the adhesive, when hot, does not have sufficient cohesion to the substrate portion in order to guarantee lasting stability.

In comparison to the adhesive technologies known to date, reactive polyolefin hot melt adhesives represent a relatively recent development, and they are not yet commonly used today for laminating in the car sector. Due to their chemical basis, the possibility of processing as a hot melt adhesive without carrier fluid, and the chemical secondary crosslinking by silane curing, this technology can be suitable for laminating olefinic substrates. Today, the first applications of olefinic hot melt adhesives are taking place in the vehicle sector, for example. However, in comparison to polar (for example, polyurethane) laminating adhesives, the available olefin adhesive solutions have the disadvantage that they develop very strong adhesion to uncoated and to Teflon-coated aluminum surfaces and are thus problematic in terms of their processing with corresponding tools.

Therefore, such adhesives are not suitable in the practical application of lamination. Laminated parts can be removed only with great difficulty from the tool after laminating. This makes utilization in practice difficult or impossible.

During lamination, particularly of films made of thermoplastic olefins such as polypropylene, the difficulty arises of the laminating hot melt adhesives developing adhesion to the laminating tool. In the case of vacuum deep-draw laminating processes, the adhesive, in this case the reactive hot melt adhesive, is applied to the back side of the decorative film and subsequently subjected to deep-draw lamination. For this purpose, the film together with the adhesive is heated and drawn onto a substrate portion, usually one based on polypropylene or resin-bound natural fibers. In the process, the molten adhesive comes in contact not only with the substrate portion to be laminated, but also with the laminating tool, in the area of the edges of the substrate portion, where the film becomes bonded with it.

An adhesive to be used in such a process therefore desirably does not adhere to the tool, since otherwise the component can subsequently no longer be removed directly from the tool. Below, this problem is referred to as a problem of adhesion. In order to avoid adhesion of the film, laminating tools are usually provided with repelling coatings. Teflon coatings are used commonly, since they have not only a good repelling action but also a long useful lifetime. Silicone coatings are also used in corresponding tools, but they are less common due to their lower useful lifetimes.

The disadvantage of such coatings is that the useful lifetimes can be of varying lengths depending on the coating type. The restoration of these coatings is associated with process downtimes and high costs.

SUMMARY

According to an exemplary aspect, disclosed is a hot melt adhesive composition, comprising:
 a) at least one silane group-containing thermoplastic poly-α-olefin which is solid at 25° C., and
 b) at least one paraffin wax.

According to another exemplary aspect, disclosed is a composite element, comprising:
 a first substrate (S1) comprising a plastic,
 the hot melt adhesive composition according to an exemplary aspect or a crosslinked hot melt adhesive composition obtained from the hot melt adhesive composition according to an exemplary aspect, and
 a second substrate (S2),
 wherein the hot melt adhesive composition or the crosslinked hot melt adhesive composition is arranged between the first substrate (S1) and the second substrate (S2).

According to another exemplary aspect, disclosed is a method for producing the composite element according to an exemplary aspect, the method comprising:
 (i) melting the hot melt adhesive composition according to an exemplary aspect,
 (ii) applying the molten hot melt adhesive composition to the first substrate (S1),
 (iii) optionally heating the first substrate (S1),
 (iv) bringing the second substrate (S2) into contact with the molten hot melt adhesive composition.

DETAILED DESCRIPTION

In order to ameliorate or avoid the problems of expensive tool coating, on the one hand, and of adhesion to the laminating tool, on the other hand, there is a demand for a polyolefin-based hot melt adhesive that is suitable for vacuum laminating with uncoated aluminum tools. Such a hot melt adhesive would no longer require a cost-intensive coating and regular restoration of the coating.

Therefore, the present disclosure provides, for example, an effective hot melt adhesive composition which ameliorates or overcomes the above disadvantages and is based, for example, on a poly-α-olefin-based hot melt adhesive that exhibits no adhesion or reduced adhesion to uncoated aluminum tools during its processing.

It has been discovered surprisingly that such properties can be achieved with a hot melt adhesive composition comprising:
 a) at least one silane group-containing thermoplastic poly-α-olefin which is solid at 25° C., and
 b) at least one paraffin wax.

For example, the hot melt adhesive composition according to the disclosure is associated with a strong reduction of the adhesion to uncoated aluminum surfaces and to Teflon- or silicone-coated aluminum tools. This makes it possible to dispense with a cost intensive coating and frequent replacement of the coating of the aluminum tools.

In the context of the present disclosure, a "poly-α-olefin," as indicated, for example, in the definition given in Rompp Chemie Lexikon (1998 version), denotes polymers having the general structure:

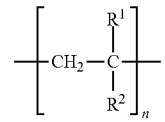

where $R^1$ denotes hydrogen and $R^2$ denotes hydrogen, a straight-chain or branched saturated aliphatic or cycloaliphatic group. Thus, poly-α-olefins contain a priori no heteroatoms such as oxygen, nitrogen or silicon, unless otherwise indicated in the context of this disclosure.

An additional exemplary aspect of the present disclosure is the use of the hot melt adhesive composition according to the disclosure for bonding films or natural fiber support materials. Additional exemplary aspects of the present disclosure relate to composite elements comprising a first substrate (S1), a second substrate (S2), and a layer of a hot melt adhesive composition according to the disclosure applied in between, as well as to a process for producing such a composite element.

In a first exemplary aspect, the present disclosure relates to a hot melt adhesive composition comprising a) at least one silane group-containing thermoplastic poly-α-olefin which is solid at 25° C., and b) at least one paraffin wax.

The silane which is liquid at 25° C. comprises silane compounds in which the silane contains at least one silylalkoxy functionality. During the curing of the hot melt adhesive compositions, such silane groups react first, with release of alcohols, to form silanols which, splitting off water, are capable of reacting with additional silanol groups in the hot melt adhesive composition. As a result of this condensation, linkage sites form in the hot melt adhesive composition.

The silane group-containing thermoplastic poly-α-olefin which is solid at 25° C. is, for example, a silane grafted poly-α-olefin.

The silane group-containing poly-α-olefin, for example, has a softening temperature from 70° C. to 150° C., for example, from 80° C. to 120° C., and, for example, from 90° C. to 110° C. The softening temperature is measured here using the ring and ball method based on DIN EN 1427.

Such silane group-containing poly-α-olefins are directly familiar to the person skilled in the art. They can be produced, for example, by grafting unsaturated silane such as vinyl trimethoxysilane on a poly-α-olefin. A detailed description for producing silane-grafted poly-α-olefins can be found in U.S. Pat. No. 5,994,474 and DE 40 00 695 A1, for example.

A silane-grafted polyethylene or polypropylene is suitable as silane group-containing solid poly-α-olefin.

Additional exemplary silane group-containing poly-α-olefins are silane-grafted poly-α-olefins, which are poly-α-olefins produced using Ziegler-Natta catalysts, onto which silane groups have been grafted. For example, they are silane-grafted polyethylene homopolymers or polypropylene homopolymers.

The grafting degree of the silane-grafted poly-α-olefin can be more than 1% by weight, for example, more than 3% by weight of silane, relative to the weight of the poly-α-olefin. If a silane-grafted poly-α-olefin prepared according to the Ziegler-Natta process is used as silane-grafted poly-α-olefin, then the grafting degree is, for example, between 1 and 8% by weight, for example, between 1.5 and 5% by weight. On the other hand, if poly-α-olefins produced via metallocene catalysts are used as silane-grafted poly-α-olefin, the grafting degree is, for example, between 8 and 12% by weight.

It is exemplary if the hot melt adhesive composition according to the disclosure comprises at least two different silane group-containing poly-α-olefins. A combination of silane-grafted poly-α-olefins which can be prepared by the Ziegler-Natta process and silane-grafted polypropylene homopolymers which can be prepared by the metallocene catalyst method are used, for example.

In an exemplary embodiment, the proportion of all the silane group-containing poly-α-olefins in the hot melt adhesive composition is more than 40% by weight, for example, it is between 50 and 95% by weight, and, for example, between 60 and 80% by weight.

The hot melt adhesive composition according to the disclosure moreover contains at least one paraffin wax. The paraffin wax is, for example, a paraffin wax with a melting or softening point in the range from 80 to 130° C., for example, in the range from 90 to 120° C. In an exemplary embodiment, the paraffin wax is a Fischer-Tropsch wax.

With regard to the quantity of the wax to be included in the hot melt adhesive composition, the disclosure is subject to no relevant restrictions except that the proportion of the wax is not so high, for example, that said wax substantially affects the adhesion of the adhesive. A substantial impairment here is understood to mean, in the context of this disclosure, that the adhesion of a composition with paraffin wax to the same substrate is more than 50% lower than in the case of a composition containing, instead of the paraffin wax, the same quantity of silane group-containing poly-α-olefin.

In an exemplary embodiment, the hot melt adhesive composition contains up to 5% by weight of paraffin wax. If the proportion of this component is higher, then the adhesion of the adhesive is affected noticeably, for example, with respect to polypropylene. In the same way, it is exemplary if at least 1% by weight, for example, at least 2% by weight of paraffin wax, relative to the hot melt adhesive composition, is contained in the hot melt adhesive composition.

In addition to the paraffin wax, other wax-like components can be added to the hot melt adhesive composition. Wax-like components suitable for hot melt adhesive compositions according to the present disclosure are, for example, waxes that can be produced by a metallocene process, such as maleic anhydride-functionalized polyolefins, in exemplary maleic anhydride-functionalized polypropylenes. Such waxes can, for example, have a softening point in the range from 100 to 180° C., for example, in the range from 120 to 160° C. With regard to the quantity of these wax-like components, the present disclosure is also not subject to any relevant restrictions. However, it has been shown to be exemplary if the proportion of such additional wax-like components is not more than 15% by weight. The content of additional wax-like components is, for example, in the range from 5 to 12% by weight.

The ratio of the wax-like components to the paraffin wax can be in the range from approximately 1:1 to approximately 1:3, and, for example, approximately 1:2.

It is exemplary if the hot melt adhesive composition according to the disclosure contains, in addition to the silane group-containing poly-α-olefin, at least one additional thermoplastic poly-α-olefin which is solid at 25° C. and which contains no silane groups. This polymer can be a homopolymer or copolymer of unsaturated monomers, selected, for example, from the group comprising ethylene, propylene, butylene, isobutylene, isoprene, vinyl acetate and vinyl ester with C3 to C12 carboxylic acids and (meth)acrylate. In the context of this disclosure, (meth)acrylate denotes both acrylates and methacrylates. Exemplary are ethylene-vinyl acetate (EVA), atactic poly-α-olefins as well as polypropylene and polyethylene as homopolymers in grafted or ungrafted form.

These solid thermoplastic polymers, for example, have a softening point, measured according to the ring & ball method, of higher than 90° C., for example, between approximately 90 and 130° C. The molecular weight (Mn) of this additional component is, for example, in the range between approximately 7000 and 250,000 g/mol.

It is exemplary to use metallocene catalysts for producing the atactic poly-α-olefins without silane groups.

The weight ratio of silane group-containing solid poly-α-olefins to solid thermoplastic polymers without silane groups is, for example, in the range from approximately 1:1 to 20:1. A proportion of solid thermoplastic polymers from approximately 5 to 35%, for example, from approximately 15 to 30% by weight, relative to the total weight of the hot melt adhesive composition, has been shown to be exemplary.

The hot melt adhesive composition according to the disclosure can contain, as additional component, a catalyst that accelerates the reaction of the silane groups. This catalyst is, for example, an organic phosphorus or tin compound, for example, dibutyl tin laurate (DBTL). Suitable organic phosphorus compounds are, for example, phosphoric acid esters, which can be used as mixtures of mono-, di- and triesters of phosphoric acid that are esterified with alkanols, for example, those having a chain length in the range from 12 to 24 carbon atoms. The acid number of the phosphoric acid esters can be in the range from approximately 120 to 240 mg/KOH per gram.

The catalyst can, for example, be included in the hot melt adhesive composition in a quantity of more than 0.05% by weight but not more than 5% by weight, for example, in a quantity in the range from approximately 0.1 to 0.5% by weight.

In addition, the hot melt adhesive composition according to the disclosure can contain additional auxiliary substances and additives, for example, those selected from the group comprising plasticizers, adhesive promoters, UV absorption agents, UV and heat stabilizers, optical brighteners, pigments, dyes, fillers and desiccants. Exemplary UV stabilizers to be included in the hot melt adhesive composition are, for example, sterically hindered phenols. An exemplary optical brightener to be included is, for example, 2,2-(2,5-thiophene-diyl)bis[5-(1,1-dimethylethyl)]benzoxazole, which is commercially available under the trade name Odyssey OB.

However, the content of such additional ingredients is, for example, not more than 10% by weight. It is exemplary for the sum of all the above-mentioned additional ingredients to amount to not more than 5% by weight, relative to the total weight of the hot melt adhesive composition.

In an exemplary embodiment, the hot melt adhesive composition according to the disclosure consists substantially of two silane group-containing thermoplastic poly-α-olefins which are solid at 25° C., up to 5% by weight of paraffin wax, a maleic anhydride-functionalized polyolefin wax, optionally a solid thermoplastic polymer, optionally a catalyst as well as optionally an optical brightener and optionally a UV stabilizer.

In principle, the production occurs in a usual manner for the person skilled in the art in the hot melt adhesives field.

The hot melt adhesive compositions according to the disclosure are liquefied by melting the thermoplastic ingredients. Here, the viscosity of the hot melt adhesive compositions can be adapted to the application temperature. For example, the application temperature at which the adhesive is in a form that is easy to process is in the range from 90 to 200° C. In this temperature range, the viscosity is approximately 1500 to 50,000 mPa*s. If the viscosity is substantially higher, then the application is difficult, whereas in the case of a viscosity which is substantially lower than 1500 mPa*s, the adhesive has such low viscosity that it runs off the material surface to be bonded at the time of the application, before it solidifies due to the cooling.

The setting and solidification of the hot melt adhesive according to the disclosure which occurs due to cooling results in rapid development of strength and high initial adhesive strength of an adhesive bond. When the adhesive according to the disclosure is used, care can be taken that the bonding occurs within the time period in which the adhesive has not yet cooled excessively, i.e., the bonding occurs while the adhesive is still fluid or at least still tacky and malleable. In addition to this physical type of solidification, the hot melt adhesive composition according to the disclosure will also continue to crosslink and gain in mechanical strength even after cooling, due to the influence of water, for example, atmospheric moisture, within a time period of, for example, a few hours or days. In contrast to the nonreactive hot melt adhesive compositions, reactive hot melt adhesive compositions cannot be heated reversibly and will liquefy again as a result. Thus, the use of such hot melt adhesive compositions is exemplary for applications in which the bonded composite element, in the course of its use or life, comes in contact with high temperatures, since the bond does not suffer any damage at such temperatures. In the same way, the use of such hot melt adhesives is exemplary to the extent that they undergo considerably less creep, due to the crosslinking.

An additional exemplary aspect of the disclosure relates to a composite element comprising a first substrate (S1), which comprises a plastic, for example, in the form of a film, a hot melt adhesive composition as described above or a crosslinked hot melt adhesive composition, as well as a second substrate (S2), wherein the hot melt adhesive composition or the crosslinked hot melt adhesive composition is arranged between the first substrate and the second substrate (S2).

A film refers, for example, to flexible flat films made of polyolefins in a thickness from 0.05 mm to 5 mm, which can be rolled up. Thus, besides "films" (in the strict sense with thicknesses of less than 1 mm), waterproofing membranes, as used, for example, for waterproofing tunnels, roofs or swimming pools, in a thickness of, for example, 1 to 3 mm, and in special cases even in a thickness of at most 5 mm, can be used. Such polyolefin films are usually produced by blade coating, casting, calendering or extrusion, and they are, for example, commercially available in rolls or produced on site. They can have a single-layer or a multi-layer structure. To the person skilled in the art, it is clear that polyolefin films can contain additional additives and processing agents such as fillers, UV and heat stabilizers, plasticizers, lubricants, biocides, flame protection agents, antioxidants, pigments such as, for example, titanium dioxide or carbon black, and dyes. Thus films of a type that does not consist of 100% polyolefins are also referred to as polyolefin films.

The second substrate (S2) can be of a different type. For example, it can also be made up of plastic or fiber materials, for example, natural fibers. The substrate is, for example, also a flat substrate, for example, in the form of a film or in the form of a nonwoven fabric.

The described composite element is, for example, a film made of thermoplastic olefin, for example, for car manufacturing, which has a stability suitable for deep-draw laminating. An additional exemplary aspect of the present disclosure therefore relates to the use of the above-described composite element for producing three-dimensionally molded objects in the context of a deep-draw process.

An additional exemplary aspect of the present disclosure is a method for producing composite elements as described above. This method comprises the steps of:

(i) melting the hot melt adhesive composition according to the disclosure as described above, (ii) applying the molten hot melt adhesive composition to a first substrate (S1) which, for example, comprises plastic, for example, a plastic film, (iii) optionally heating the first substrate (S1), (iv) bringing the second substrate (S2), for example, a film or a natural fiber support material, in contact with the molten adhesive composition.

By heating the film (S1), the latter becomes soft and can therefore adapt to the geometry of the substrate without folds forming.

The polyolefin films used here can be decorative films that have a surface structure. This surface structure can be embossed, for example, before or during or after the bonding.

Moreover, it is exemplary that the above-described process is subsequently further developed by a step of deep drawing the composite element after step (iv).

Here, it is exemplary if the adhesive composition can be applied directly to the polyolefin film and it is not necessary to first apply a "primer," as is the case, for example, with polyurethane dispersion adhesives.

In the press lamination process, the molten hot melt adhesive composition is applied to the substrate. The bonding of the substrate to the second substrate here occurs under the influence of heat by joining and pressing.

The hot melt adhesive composition according to the disclosure is characterized, for example, in the case of processing with aluminum tools, in that it presents no pronounced adhesion to said tools. Thus, cost-intensive coating of these aluminum tools and regular renewal of the coating can be reduced or avoided. At the same time, the hot melt adhesive compositions according to the disclosure present an adhesive effect comparable to that of comparative adhesives and, for example, for bonded films that are subjected to a subsequent deep-draw process, they have been shown to be similar to comparative polyurethane-based adhesive systems. In comparison to the latter, they are characterized in that, for example, they can be applied to the film even before the deep-draw process, and they make it possible to dispense with an additional primer for improving the surface properties of the polyolefin films. The hot melt adhesive according to the disclosure in addition cures rapidly and completely with moisture without odor development, and in the process it does not form any bubbles even in a thick-layer application. After curing, the hot melt adhesive according to the disclosure has a relatively high final strength and thermal stability as well as good resistance to environmental influences.

Below, the disclosure is illustrated by examples.

EXAMPLES

The roll peel strengths of the compositions presented in the following Table 1 were determined.

TABLE 1

| Component | Example 1 | Example 2 | Example 3 | Example 4 | Comparison Example 1 |
|---|---|---|---|---|---|
| Silane-grafted poly-α-olefin | 52.18 | 53.19 | 54.24 | 47.68 | 49.8 |
| Silane-grafted poly-α-olefin (10% Si) 1 | 9.49 | 9.67 | 9.86 | 8.67 | 9.05 |
| Poly-α-olefin wax 2 | 9.49 | 9.67 | 9.86 | 8.67 | 9.05 |
| Amorphous poly-α-olefin 3 | 23.72 | 24.18 | 24.65 | | |
| Amorphous poly-α-olefin 4 | | | | 21.67 | 22.64 |
| Tackifier | | | | 8.67 | 9.05 |
| DBTL | | | | | 0.1 |
| UV stabilizer 5 | 0.24 | 0.24 | 0.24 | 0.25 | 0.23 |
| Catalyst 6 | 0.14 | 0.15 | 0.15 | | 0.15 |
| Paraffin wax 7 | 4.74 | 2.9 | 0.99 | 4.33 | |
| Optical brightener | | | | | 0.02 |

1 = Silane-grafted poly-α-olefin with a silane content of 10%;
2 = maleic anhydride-modified polypropylene with a softening point of approximately 140° C. as well as an acid number of approximately 48 mg KOH/g;
3 = amorphous poly-α-olefin with a softening point (based on the ring and ball method) in the range from 118 to 130° C., a molecular weight Mn of 7300 as well as a gas transition temperature of −28° C.;
4 = amorphous poly-α-olefin with a softening point of 118 ± 4° C. as well as a melt viscosity of 8000 ± 2000 mPa * s;
5 = sterically hindered phenol;
6 = reaction product of P4O10 and an alcohol with an acid number (in mg KOH/g) of 180;
7 = non-functionalized Fischer Tropsch hard paraffin with a density of 0.94 g/cm³ and a molecular weight of 750 g/mol as well as a dropping point in the range from 108 to 124° C.

Examples 1 to 4 are compositions according to the disclosure. Examples 1 to 3 differ in each case only in their paraffin wax content. Example 4 differs from Example 1 by a different amorphous poly-α-olefin and the addition of a tackifier.

Comparison Example 2 is based on the commercially available adhesive SikaMelt® 9632.

The roll peel strengths of two adhesive compositions according to the prior art were also determined, of which Comparison Example 1 has a composition comparable to Example 4, except that the paraffin wax is not present. Comparison Example 2, by comparison, represents a comparative polyurethane adhesive, which has exemplary properties in terms of its adhesion behavior on aluminum surfaces.

The roll peel strengths of all the adhesives were determined as follows. From the respective adhesive, a 100 μm film is drawn onto silicone paper and applied by the transfer process to the TPO film (test piece 5×15 cm). Subsequently, the silicone paper is pulled off the adhesive, and the TPO film, coated with the adhesive, is placed under an IR radiator and heated to approximately 200° C. until the adhesive is molten. Subsequently, the TPO film is pressed against an aluminum plate in a press for 40 seconds. For the evaluation of the adhesion to aluminum, the roll peel value is determined after 5 minutes of pressing process. The measured roll peel values are presented in the following Table 2.

TABLE 2

| | Roll peel values in N/cm |
|---|---|
| Example 1 | 0.08 |
| Example 2 | 0.08 |
| Example 3 | 0.13 |
| Example 4 | 0.41 |
| Comparison Example 1 | 0.45 |
| Comparison Example 2 | 0.25 |

From the measured values one can see that the composition according to Example 1 has the lowest adhesion behavior on an aluminum surface. Even in comparison to the polyurethane-based adhesive, the adhesion is lower. In comparison, the adhesive according to Comparison Example 1 exhibits the highest strengths and thus adheres too strongly to the aluminum plate. Example 4, which differs from Comparison Example 1 only in having paraffin wax as an additional component, in comparison to the latter has lower roll peel values.

One can also see from the examples that Comparison Example 1, in spite of its wax content, does not lead to the required surface dryness of the adhesive. After cooling, an adhesive containing only this wax leads has a residual tackiness that leads to adhesion of adhesive residues to the aluminum tool.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A hot melt adhesive composition, comprising:
   a) at least one silane group-containing thermoplastic poly-α-olefin which is solid at 25° C.,
   b) at least one paraffin wax,
      wherein the paraffin wax has a melting or softening point in the range from 80 to 130° C.,
      wherein the wax is contained in a quantity of up to 5% by weight relative to the hot melt adhesive composition in said hot melt adhesive composition, and
   c) from 5% to 12% by weight of at least one maleic anhydride-functionalized polyolefin.

2. The hot melt adhesive composition according to claim 1, wherein the silane group-containing poly-α-olefin which is solid at 25° C. has a softening temperature from 70 to 150° C.

3. The hot melt adhesive composition according to claim 1, wherein the silane group-containing poly-α-olefin which is solid at 25° C. is a silane-grafted poly-α-olefin.

4. The hot melt adhesive composition according to claim 1, wherein the silane group-containing poly-α-olefin which is solid at 25° C. is a poly-α-olefin produced using a Ziegler-Natta catalyst, to which silane groups have been grafted.

5. The hot melt adhesive composition according to claim 1, wherein the composition comprises at least two different silane group-containing solid poly-α-olefins.

6. The hot melt adhesive composition according to claim 1, wherein the composition contains at least 40% by weight, relative to the hot melt adhesive composition, of the at least one silane group-containing thermoplastic poly-α-olefin which is solid at 25° C.

7. A hot melt adhesive composition, comprising:
   a) at least one silane group-containing thermoplastic poly-α-olefin which is solid at 25° C.,
   b) at least one Fischer-Tropsch wax,
      wherein the wax has a melting or softening point in the range from 80 to 130° C.,
      wherein the wax is contained in a quantity of up to 5% by weight relative to the hot melt adhesive composition in said hot melt adhesive composition, and
   c) from 5% to 12% by weight of at least one maleic anhydride-functionalized polyolefin.

8. The hot melt adhesive composition according to claim 1, further comprising a catalyst which accelerates the reaction of silane groups.

9. The hot melt adhesive composition according to claim 8, wherein the catalyst is contained therein in a quantity from 0.05 to 5% by weight, relative to the hot melt adhesive composition.

10. The hot melt adhesive composition according to claim 1, further comprising a thermoplastic poly-α-olefin without silane groups, which is solid at 25° C.

11. A method of bonding, comprising bonding a first substrate to a second substrate with the hot melt adhesive composition according to claim 1.

12. A composite element, comprising:
   a first substrate (S1) comprising a plastic,
   the hot melt adhesive composition according to claim 1 or a crosslinked hot melt adhesive composition obtained from the hot melt adhesive composition according to claim 1, and
   a second substrate (S2),
   wherein the hot melt adhesive composition or the crosslinked hot melt adhesive composition is arranged between the first substrate (S1) and the second substrate (S2).

13. The composite element according to claim 12, wherein the second substrate (S2) is a fiber material or a film.

14. A three-dimensionally molded object formed from the composite element according to claim 12.

15. A method for producing the composite element according to claim 12, the method comprising:
   (i) melting the hot melt adhesive composition according to one of claim 1,
   (ii) applying the molten hot melt adhesive composition to the first substrate (S1),
   (iii) optionally heating the first substrate (S1),
   (iv) bringing the second substrate (S2) into contact with the molten hot melt adhesive composition.

16. The method according to claim 15, wherein the composite element, following step (iv), is subjected to a step of deep drawing.

17. The hot melt adhesive composition according to claim 1, wherein the silane group-containing poly-α-olefin which is solid at 25° C. has a softening temperature from 90 to 110° C.

18. The hot melt adhesive composition according to claim 1, wherein the silane group-containing poly-α-olefin which is solid at 25° C. is a silane-grafted polyethylene or polypropylene.

19. The hot melt adhesive composition according to claim 1, wherein the composition contains 60 to 80% by weight, relative to the hot melt adhesive composition, of the at least one silane group-containing thermoplastic poly-α-olefin which is solid at 25° C.

20. The hot melt adhesive composition according to claim 1, wherein the paraffin wax has a melting or softening point in the range from 90 to 120° C.

21. The hot melt adhesive composition according to claim 8, wherein the catalyst which accelerates the reaction of silane groups is in the form of an organic phosphorus or tin compound.

22. The hot melt adhesive composition according to claim 8, wherein the catalyst is contained therein in a quantity from 0.1 to 0.5% by weight relative to the hot melt adhesive composition.

23. The hot melt adhesive composition according to claim 10, wherein the thermoplastic poly-α-olefin without silane groups, which is solid at 25° C., includes an atactic poly-α-olefin without silane groups.

24. The composite element according to claim 8, wherein the second substrate (S2) is a natural fiber material or a film made of polyolefin.

25. The method according to claim 11, wherein the first substrate (S1) comprises plastic, and the second substrate (S2) comprises a natural fiber material or a film made of polyolefin.

* * * * *